(12) United States Patent
Giallorenzi et al.

(10) Patent No.: US 7,986,654 B1
(45) Date of Patent: Jul. 26, 2011

(54) METHODS, COMPUTER PROGRAM PRODUCTS AND APPARATUS PROVIDING LOW COMPLEXITY DETERMINATION OF CROSS-CORRELATIONS

(75) Inventors: Thomas Robert Giallorenzi, Riverton, UT (US); Randal R. Sylvester, West Valley, UT (US); Michael T. Heins, Draper, UT (US)

(73) Assignee: L-3 Communicaions Corporation, New York, NY (US)

( * ) Notice: Subject to any disclaimer, the term of this patent is extended or adjusted under 35 U.S.C. 154(b) by 1077 days.

(21) Appl. No.: 11/818,203

(22) Filed: Jun. 12, 2007

(51) Int. Cl.
*G06F 15/16* (2006.01)
(52) U.S. Cl. .......................................... 370/320; 370/335
(58) Field of Classification Search .................. 370/320, 370/324, 335; 455/456.1
See application file for complete search history.

(56) References Cited

U.S. PATENT DOCUMENTS 7,593,736 B1 * 9/2009 Duffett-Smith et al. ... 455/456.1

* cited by examiner

*Primary Examiner* — Sam Bhattacharya
(74) *Attorney, Agent, or Firm* — Harrington & Smith

(57) ABSTRACT

The exemplary embodiments of the invention provide methods, computer program products and apparatus for determining cross-correlations between the received signals in a set of users. An exemplary method includes: receiving an input signal comprising a plurality of user signals, selecting a first received signal and a second received signal from the plurality of user signals, determining a timing offset between the first signal and the second signal, and using the determined timing offset, a first identification of the first signal, and a second identification of the second signal as indices to retrieve at least one cross-correlation coefficient from a memory.

24 Claims, 3 Drawing Sheets

METHODS, COMPUTER PROGRAM PRODUCTS AND APPARATUS PROVIDING LOW COMPLEXITY DETERMINATION OF CROSS-CORRELATIONS

TECHNICAL FIELD

The teachings in accordance with the exemplary embodiments of this invention relate generally to code systems and, more particularly, to a multiuser architecture for a code division multiple access (CDMA) system.

BACKGROUND

In typical code division multiple access (CDMA) systems, several users transmit over a common communication channel, typically using the direct sequence spread spectrum technique. The receiver in this environment receives a signal that is the sum of all of the transmitted signals in noise, and the receiver's job is to reliably decode the signal of interest from this received composite signal. The user signals are not synchronized in general and typically have unequal received signal strengths. The receiver may be a base station in a cellular telephone cell or personal communication network (PCN) cell, or it may be one of the user's receivers in a decentralized multiple access network.

An aspect of efficient multiuser receiver techniques for CDMA systems is to estimate the multiuser interference to the signal of interest from all the other users, and subtract it out, leaving a better estimate of the signal of interest. Performing such an operation requires an estimate of the data being sent by the other users, and of the cross-correlations between each other user and the user of interest.

Nonzero cross-correlations between the users arise due to the non-orthogonality of the signature sequences used by the various users. The magnitude of the cross-correlation between the users is determined by two factors: 1) the basic non-orthogonality of the spreading codes used; and 2) the frequency and phase offsets of the carriers at the receiver.

To perform normal coherent detection, the receiver must synchronize to the received symbol timing, carrier frequency and phase. In addition, the level of interference between the users is exaggerated if the interfering user is stronger then the user of interest. It is possible to use the local estimates of the synchronization parameters along with a knowledge of the set of signature sequences of the active users to estimate the set of inter-user cross-correlations. In addition, the energy of each user's signal may also be estimated at the receiver.

In order to implement the most effective multiuser receiver architectures for a CDMA system, it is necessary to have a knowledge of the set of cross-correlations between the signature sequences of the various users in the system. These cross-correlations are typically derived from a bank of $N^2-N$ correlators, where N is the number of users active in the system. These correlators are usually implemented in dedicated, fabricated circuitry and similar hardware. As a result, if N is large, the number of correlators becomes excessive and tends to make such systems expensive.

SUMMARY

The foregoing and other problems are overcome, and other advantages are realized, in accordance with the exemplary embodiments of these teachings.

In accordance with an exemplary embodiment of the invention, a method includes receiving an input signal comprising a plurality of user signals, selecting a first user signal and a second user signal from the plurality of user signals, determining a timing offset between the first user signal and the second user signal, and using the timing offset, a signal sequence of the first user signal, and a signal sequence of the second user signal as indices to retrieve at least one cross-correlation coefficient from a memory.

In accordance with another exemplary embodiment of the invention, a program of machine-readable instructions, tangibly embodied on an information bearing medium and executable by a digital data processor, performs actions including receiving an input signal comprising a plurality of user signals, selecting a first user signal and a second user signal from the plurality of user signals, determining a timing offset between the first user signal and the second user signal, and using the timing offset, a signal sequence of the first user signal, and a signal sequence of the second user signal as indices to retrieve at least one cross-correlation coefficient from a memory.

In accordance with another exemplary embodiment of the invention, a network element includes an element for receiving an input signal comprising a plurality of user signals, an element for selecting a first user signal and a second user signal from the plurality of user signals, an element for computing a timing offset between the first user signal and the second user signal, and an element for using the timing offset, a signal sequence of the first user signal, and a signal sequence of the second user signal as indices to retrieve at least one cross-correlation coefficient from a memory.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

In exemplary embodiments of the invention, there is disclosed a method, a computer program product and an apparatus for estimating cross-correlations between the signature sequences (e.g., PN codes) in a set of users. The cross-correlations may be derived, or otherwise computed, through the use of a look-up table, or other pre-computed data stored in a repository (e.g., a memory). For example, the look-up table maps the timing offset between two signals, as well as indices corresponding to the signals, to a cross-correlation coefficient. In further exemplary embodiments of the invention, an interpolator may be utilized to lessen the amount of data that is stored in the look-up table. The cross-correlation coefficients may be computed once and stored for retrieval. This configuration effectively substitutes retrieval from memory for the more costly and energy intensive implementation of hardware, such as multiple correlators, typically used. As a result of the use of the exemplary embodiments described herein, the computational burden for multiuser cancellation is substantially lessened, thus lowering costs and bringing the benefits of multiuser CDMA receiver technology into the realm of possibility for systems where it was heretofore considered impractical.

When attempting to derive a set of cross-correlations one may further estimate the energy of each user's signal at the receiver. In the exemplary embodiments of the invention, energy estimation of the user's signals at the receiver need not be performed. Rather, the estimation of "normalized" cross-correlations between the signature sequences in the set is derived and employed.

As described more fully below, the exemplary embodiments of the invention provide a method, computer program product and apparatus for determining the set of cross-correlations between the signature sequences (e.g., PN codes) of a given user and other, interfering users in the system. Once the receiver determines the set of cross-correlations, the set can be utilized, for example, to cancel the interference caused by the interfering users.

Figure 3:
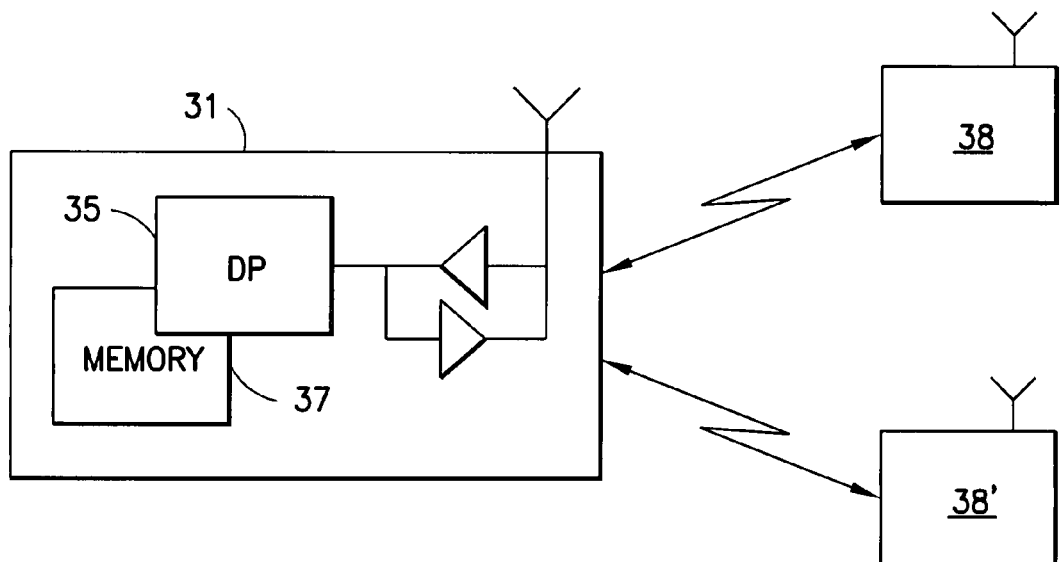
FIG. 3 shows a diagram of an exemplary embodiment of a system in which the cross-correlator of the exemplary embodiments of the invention can operate.

With reference to FIG. 3, there is illustrated an exemplary embodiment of a system comprising network elements for implementing the cross-correlator 10 of the invention. Multiple subscriber units 38 are in communication with a radio base unit (RBU) 31. Each network element, such as RBU 31 and subscriber unit 38, includes a suitable wireless transceiver 33 coupled to a data processor (DP) 35. DP 35 is coupled to a volatile and/or non-volatile memory 37. DP 35 can be fabricated as an integrated circuit operative on a computer chip, as a non-limiting example. Memory 37 stores program code that is executable by the DP 35. The program code is executed to implement aspects of the exemplary embodiments of the invention, such as the retrieval of cross-correlation coefficients from look-up table 17 (described below), for example. In an exemplary and non-limiting embodiment of the invention, RBU 31 is a network access node, such as a base station.

As noted above, the exemplary embodiments of the invention can be implemented by computer software executable by the DP 35 of the RBU 31 or by the subscriber unit 38, by hardware, or by a combination of software and hardware. It is further noted that the various blocks shown in FIGS. 1 and 4 may represent program steps, logic circuits, or a combination of program steps and logic circuits.

Note that as referred to below, a symbol epoch is considered to be a portion of the received signal or of the PN code of the received signal as measured in time between the times of arrival for consecutive edges of symbols. That is, a symbol epoch is one symbol as measured from the beginning of the symbol to its end (i.e., the transition to the next symbol).

Similarly, as referred to below, a chip epoch is considered to be a portion of the received signal or of the PN code of the received signal corresponding to one chip (i.e., measured from chip edge to successive chip edge), where a chip effectively comprises a measure of time. Note that since "symbol epoch" and "chip" refer to measures of time with regards to a received signal or to the PN code of a received signal, the terms may also be used to refer to the corresponding portion of the received signal or of the PN code of the received signal.

Generally, one symbol includes an integer number of chips. A PN code for a given user usually repeats every symbol. Thus, one symbol epoch (or "a symbol epoch") generally corresponds to a single iteration of a PN code for the given user/received signal. Furthermore, and as explained below with respect to the exemplary embodiments of the invention, comparing two symbol epochs, one each from two different users, allows for measuring the time offset between the PN codes of the respective users.

Those of ordinary skill in the art will appreciate that a PN code is generally understood to be a relatively high rate signal (i.e., as compared with the rate of the data encoded by the PN code) comprising transmitted data.

Generally, a PN code can be represented as a series of chips. For example, in binary, each chip may correspond to a +1 or a −1. Furthermore, as described below with respect to the exemplary embodiments of the invention, each signal encoded with a PN code is assumed to correspond to a PN code identifier that identifies the signal, for example, by referring to the PN code of the signal. That is, the PN code identifier comprises an index useful for referring to the PN codes of different users (i.e., signals from different users).

Figure 1:
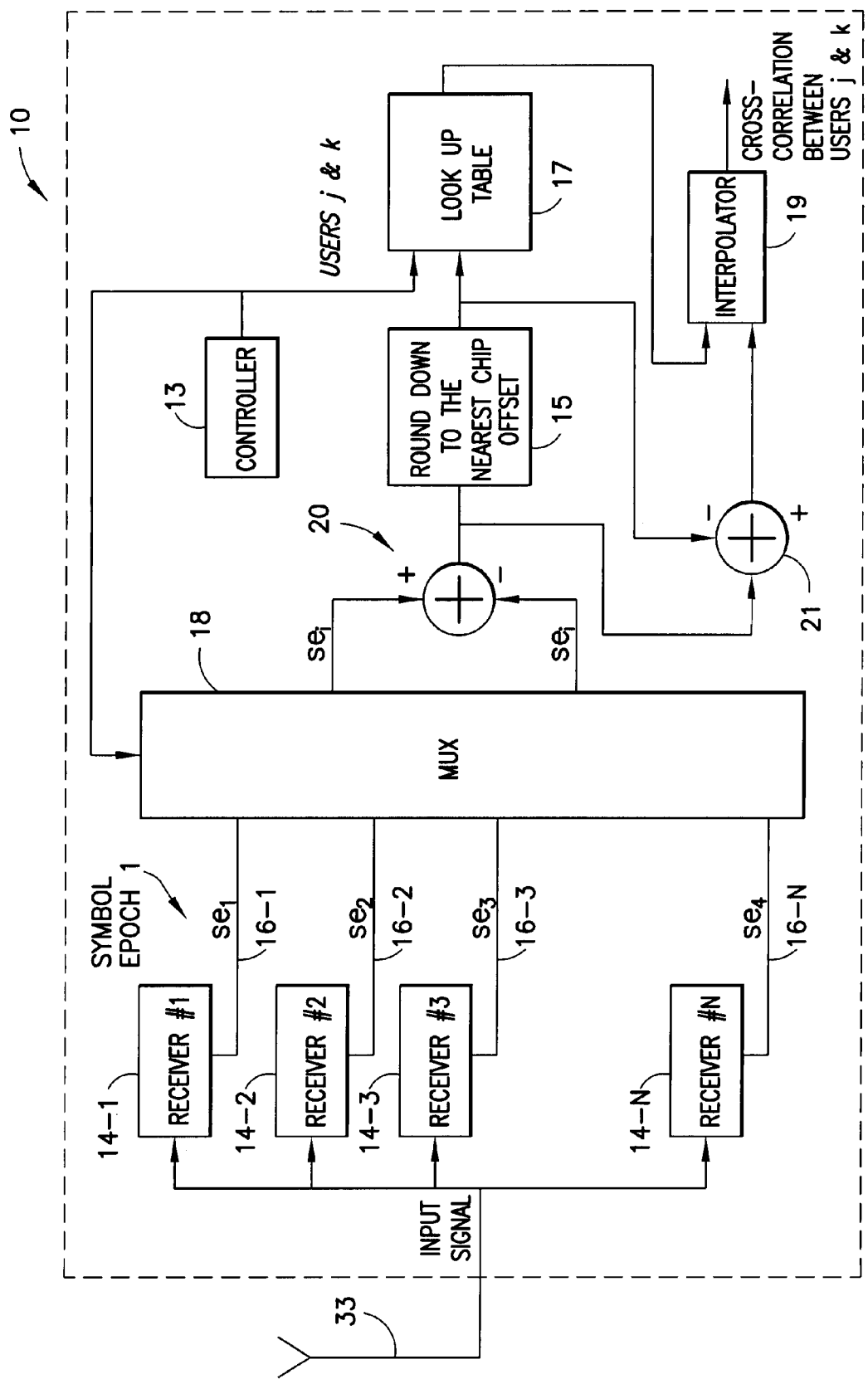
FIG. 1 shows a schematic block diagram of an exemplary embodiment of a cross-correlator according to the invention.

With reference to FIG. 1, there is illustrated a schematic block diagram of an exemplary embodiment of a cross-correlator 10 according to the invention. Cross-correlator 10 obtains an input signal from antenna 33. The input signal from antenna 33 is a spread spectrum signal which is the sum of the signals received from all of the current subscriber units 38 of the CDMA system that are transmitted at the same time. Each subscriber unit 38 is assigned a separate signature sequence.

The input signal from antenna 33 is applied to a plurality of N receivers 14-1 through 14-N. The output signals from receiver 14-1 through 14-N, comprising symbol epochs ($se_1$-$se_N$), are applied, respectively, to a multiplexer 18 via leads 16-1 through 16-N. When directed, as by controller 13, for example, multiplexer 18 selects pairs of two of the signals from leads 16-1 through 16-N and compares the selected signals in circuit 20 to produce a correlation product of the two selected signals, for example, by subtracting the time arrivals of the signals. The output of circuit 20 is the timing offset, measured in chips, between the two selected signals. For reasons that are explained more fully below, the output of summing circuit 20 is provided as an input to rounder 15. Rounder 15 operates to round the inputted timing offset to obtain an integer value. In the exemplary embodiment illustrated, rounder 15 rounds the inputted timing offset down to the nearest integer value. The output of rounder 15 forms one input for using look-up table 17.

In the exemplary embodiment illustrated, look-up table 17 is a three dimensional table of cross-correlation coefficients that uses three indices for retrieving individual cross-correlation coefficients. The indices include a PN code identifier for each of the two user signals and the integer timing offset value output by rounder 15. As noted above, controller 13 directs the operation of multiplexer 18 by providing multiplexer 18 with a reference (e.g., PN code identifier) to each of two signals (e.g., to symbol epochs of the two signals). Controller 13 likewise provides the PN code identifiers of each of the two users corresponding to the two signals of interest, herein referred to as $users_{j,k}$, to the look-up table 17, while rounder 15 provides the look-up table with the rounded timing offset for $users_{j,k}$. Using these three indices, the look-up table 17 enables retrieval of at least one correlation coefficient based on the three inputted indices and corresponding to the two signals of interest.

In the event that storage space for look-up table 17 is not a limiting consideration, the dimension of look-up table 17 can be of sufficient granularity such that the desired cross-correlation between $users_{j,k}$ can be directly retrieved. The number of elements stored in look-up table 17 is equal to the (number of users)$^2$ X the number of possible timing offset values represented in look-up table 17. For example, if the possible timing offsets range from a value of zero to fifty, and each timing offset value is accurate to a thousandth of a chip, a possible timing offset value is 43.673 chips. In a scenario where there are one hundred possible subscriber units 38 and approximately 50,000 gradations of timing offset values, the number of elements corresponding to cross-correlations in look-up table 17 is approximately equal to $100^2 \times 50,000$, or approximately one half billion elements. It is evident that, in the above example, were the timing offset to be quantized to integer values between one and fifty, the number of elements needed to be stored in look-up table 17 is reduced by a factor of one thousand.

To enable such a reduction in the number of stored elements, the exemplary embodiment of FIG. 1 utilizes a look-up table 17 wherein the timing offset values are quantized to integer values. As noted above, the rounder 15 is utilized to round the timing offset value outputted by circuit 20 to an integer value. While converting the timing offset value to an integer therefore allows the size of the look-up table 17 to be reduced, there is introduced a potential diminution in the accuracy of the retrieved cross-correlation values from look-up table 17 (e.g., based on the reduction in the number of elements of look-up table 17).

To offset this potential source of error, an interpolator 19 may be used. Interpolator 19 operates to interpolate between two values returned from the look-up table 17. As described above, the timing offset value outputted from circuit 20 is rounded down to the nearest integer value. As a result, a more accurate timing offset value would be one between the rounded integer value outputted by rounder 15 and the next larger integer value. Therefore, instead of retrieving only one cross-correlation value from the look-up table 17, in exemplary embodiments employing the interpolator 19, two cross-correlation values are retrieved. Specifically, a first cross-correlation value is retrieved using the PN code identifiers of each of the two user signals and the integer value output of rounder 15 as indices, and a second cross-correlation value is retrieved using the same PN code identifiers of each of the two user signals and the next highest integer value as indices.

These two cross-correlation values are outputted from the look-up table 17 and form inputs to interpolator 19. Comparator 21 receives as inputs the output of circuit 20 and rounder 15. By subtracting the output of rounder 15 from the output of summing circuit 20, comparator 21 outputs to interpolator 19 a value equal to the amount truncated from the timing offset by rounder 15. Referring to the above example of a timing offset of "46.673", the value outputted by comparator 21 is "0.673".

Receiving as input the outputs of comparator 21 and look-up table 17, interpolator 19 is able to interpolate between the two values inputted from look-up table 17. In such a manner, a more accurate cross-correlation vale can be obtained.

In other exemplary embodiments, the look-up table 17 may be programmed to output two cross-correlation values. As a non-limiting example, if the rounder 15 is configured to round down to the nearest chip offset (e.g., as described above with respect to FIG. 1), the look-up table 17 may output the corresponding cross-correlation value and the next highest cross-correlation value. In further exemplary embodiments, the controller 13 may be programmed in a similar manner instead of or in addition to the look-up table 17.

Various methods of interpolation can be employed by the interpolator 19. If the chips associated with each user signal are considered unfiltered, the partial cross-correlation terms as a function of bit timing offset will be piecewise linear. As a result, in such a case, the interpolator 19 can employ linear interpolation between the two retrieved cross-correlation values to compute, or otherwise derive, the desired cross-correlation value. Alternatively, if the chips are filtered, the function required to be applied by the interpolator 19 will no longer be precisely piecewise linear, but will be continuous, and may still be well approximated with a piecewise linear function. Alternative functions that can be applied by the interpolator 19 include, but are not limited to, cubic splines and raised cosine functions. After interpolation, interpolator 19 outputs the derived cross-correlation between the two users$_{j,k}$.

The look-up table 17 may be computed (e.g., created) once, either prior to or upon receiving the signals. It may be desirable to have the look-up table 17 generated in advance and stored for subsequent use. The generation of the cross-correlation values stored in the look-up table 17 are generally known to one of ordinary skill in the art and may involve such traditional operations as multiplying the two signals and integrating over a symbol time for each chip offset, as non-limiting examples. As described above, the look-up table 17 comprises three dimensions one each corresponding to the PN code identifiers of the two signals and the chip offset output by the rounder 15. As such, generally, the look-up table 17 of FIG. 1 comprises a three dimensional table or matrix, which may also be referred to as a "tensor." In other exemplary embodiments, the look-up table 17 may comprise a greater or lesser number of dimensions. For example, the look-up table may comprise a two dimensional table where one of the dimensions corresponds to a single indicia of the two signals (e.g., provided to the look-up table by another component). As an additional, non-limiting example, the look-up table may comprise a greater number of dimensions with the added dimension(s) corresponding to additional, different attributes of the received signals.

While described with reference to rounding the timing offset down to the nearest integer value, it will be apparent to one skilled in the art that in alternative embodiments of the invention the timing offset value output from circuit 20 can be rounded up to the next highest integer value by rounder 15. When such is done, the indices for the two cross-correlation values requested from look-up table 17 include the integer output of rounder 15 and the integer value that is one less than the integer output of rounder 15. Likewise, comparator 21 operates to subtract the output of summing circuit 20 from the output of rounder 15.

While described above in FIG. 1, and elsewhere herein, with respect to chips and symbol epochs, the exemplary embodiments of the invention are not limited to only these units for measurements of the received signals. In other exemplary embodiments, any suitable unit of measurement may be utilized, such as microseconds (μs) or nanoseconds (ns), as non-limiting examples.

Furthermore, while described above in FIG. 1, and elsewhere herein, with respect to a PN code identifier, the exemplary embodiments of the invention are not limited to identifying received signals by the corresponding PN code. In other exemplary embodiments, the received signals may be identified (i.e., distinguished) utilizing different indicia, indices, references or characteristics.

Figure 2:
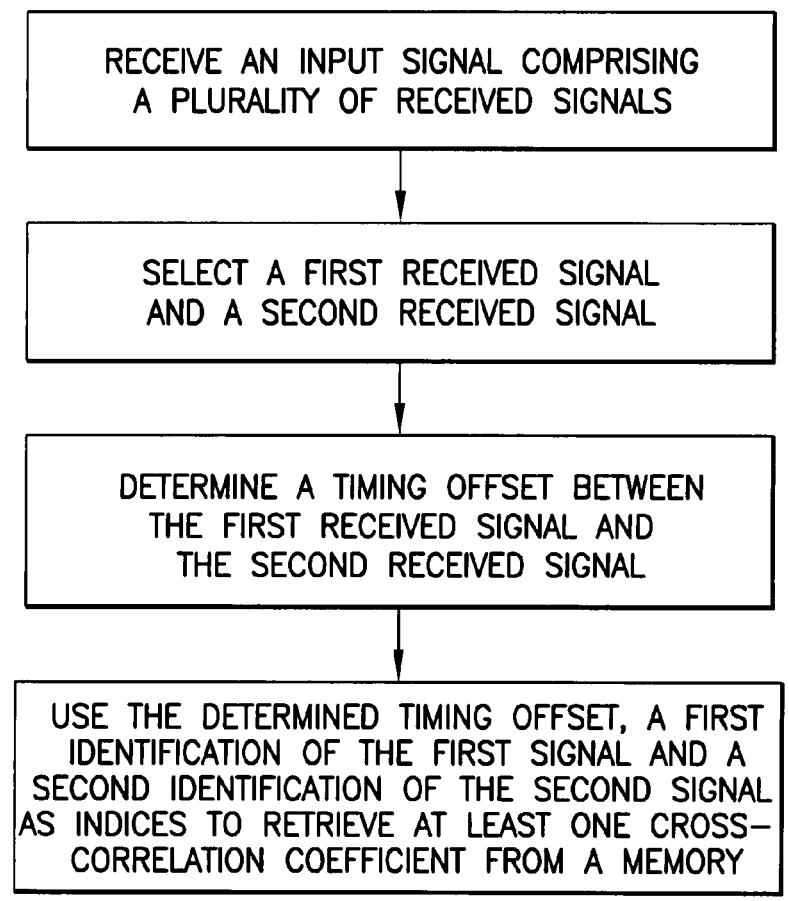
FIG. 2 shows a flow chart of an exemplary embodiment of a method according to the exemplary embodiments of the invention.

With reference to FIG. 2, there is illustrated a flow chart of an exemplary embodiment of the invention. At step A, an input signal, comprising a plurality of received signals, is received. It is assumed that the receiver has knowledge of the spreading codes and signature sequences used by all subscriber units 38 of the system. In the case that the receiver is a base station or similar network element, this is usually the case. Even in the case that the receiver is a mobile device, knowledge of the spreading codes and signature sequences used by all users of the system can be conveyed to the mobile device.

At step B, a pair of signals (a first received signal and a second received signal) is selected. The selected signals correspond to signals between which the cross-correlation coefficient is desired to be known. While illustrated as showing the derivation of a cross-correlation coefficient between two user signals, in practice the process described herein may be repeated as many times as is necessary to derive all of the cross-correlation coefficients between a desired signal and every other signal.

At step C, a timing offset is determined for the selected pair of signals. As described above, the timing offset can be rounded (e.g., using rounder 15) to the nearest integer in order to decrease the size of the look-up table 17.

At step D, the determined timing offset of the two signals and the identifications of the two user signals are used as indices to retrieve at least one cross-correlation value from a memory (e.g., look-up table 17). As described more fully above, if the computed timing offset is rounded to the nearest integer, two values may be retrieved from the look-up table 17.

Also as described more fully above, if the computed timing offset was rounded to the nearest integer and, consequently, two values were retrieved from the look-up table 17, the two retrieved values may be interpolated to derive the desired cross-correlation coefficient. As noted above, steps B and C can be repeated selecting different pairs of user signals until all of the desired cross-correlation coefficients have been derived.

Figure 4:
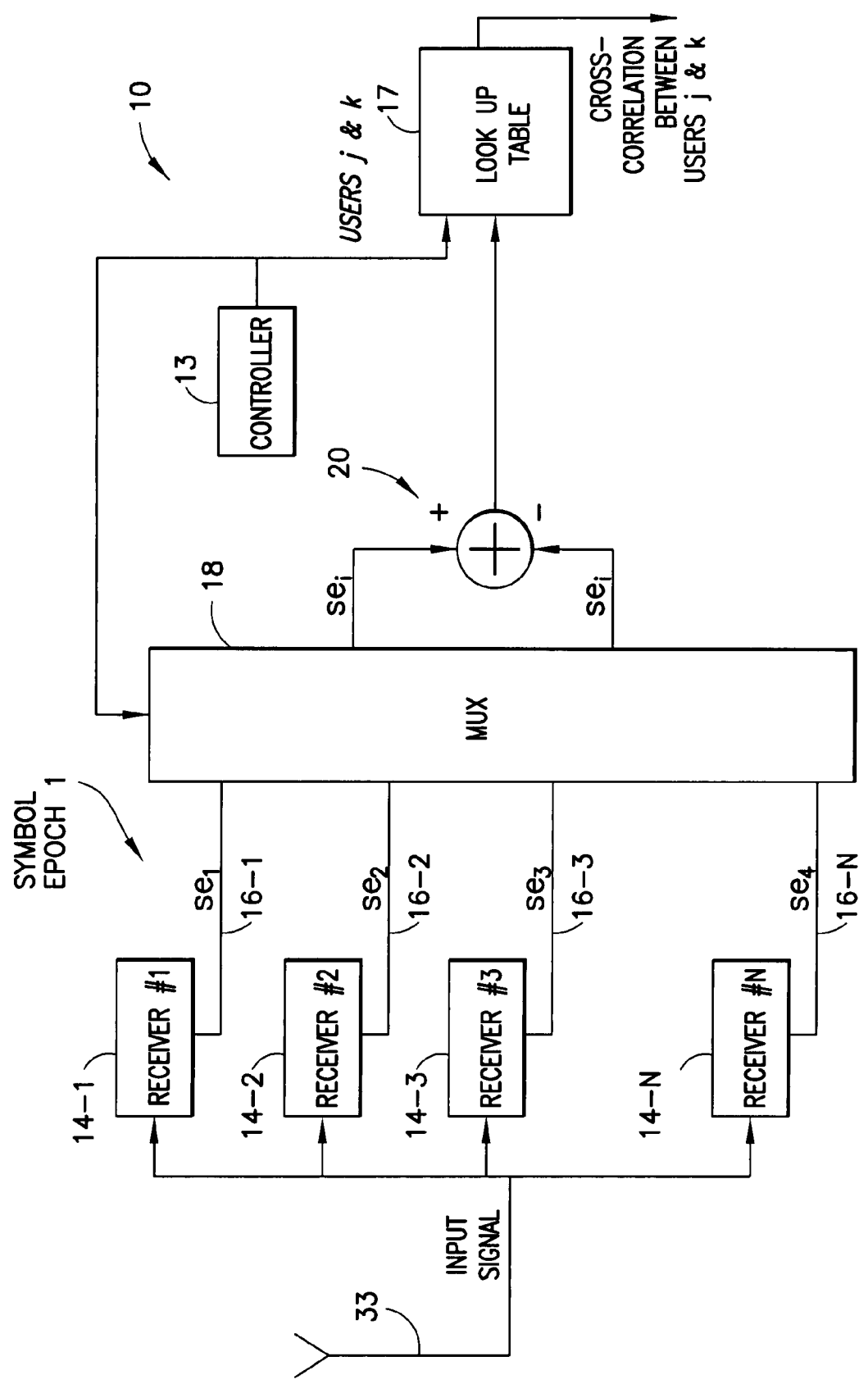
FIG. 4 shows a schematic block diagram of another exemplary embodiment of a cross-correlator according to the exemplary embodiments of the invention.

With reference to FIG. 4, there is illustrated another exemplary embodiment of the cross-correlator 10 of the invention. As noted above, the cross-correlator 10 of the invention can be implemented without an interpolator 19, as when the timing offset value is not rounded to an integer value. In such an exemplary embodiment, the output of circuit 20 forms an input of look-up table 17.

In general, the various exemplary embodiments of the invention may be implemented in hardware or special purpose circuits, software, logic or any combination thereof. Embodiments of the invention may be practiced using various components such as integrated circuit modules.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, by an apparatus, an input signal comprising a plurality of received signals;
   selecting, by the apparatus, a first received signal and a second received signal from said plurality of received signals;
   determining, by the apparatus, a timing offset between said first signal and said second signal; and
   using, by the apparatus, said determined timing offset, a first identification of said first signal, and a second identification of said second signal as indices to retrieve at least one cross-correlation coefficient.

2. The method of claim 1, wherein the at least one cross-correlation coefficient is retrieved from a look-up table.

3. The method of claim 1, wherein said timing offset is rounded to an integer timing offset value.

4. The method of claim 3, wherein said at least one cross-correlation coefficient comprises a first cross-correlation coefficient and a second cross-correlation coefficient.

5. The method of claim 4, further comprising:
   interpolating between said first cross-correlation coefficient and said second cross-correlation coefficient using said timing offset and said integer timing offset value to obtain an interpolated cross-correlation value.

6. The method of claim 5, wherein said interpolating comprises applying at least one of a linear function, a cubic spline, and a raised cosine function.

7. The method of claim 1, wherein the first identification comprises a first PN code identifier corresponding to the first received signal and the second identification comprises a second PN code identifier corresponding to the second received signal.

8. A computer-readable memory storing program instructions, execution of the program instructions by an apparatus resulting in operations comprising:
   receiving an input signal comprising a plurality of received signals;
   selecting a first received signal and a second received signal from said plurality of received signals;
   computing a timing offset between said first signal and said second signal; and
   using said timing offset, a first identification of said first signal, and a second identification of said second signal as indices to retrieve at least one cross-correlation coefficient.

9. The computer-readable memory of claim 8, wherein the at least one cross-correlation coefficient is retrieved from a look-up table.

10. The computer-readable memory of claim 8, wherein said timing offset is rounded to an integer timing offset value.

11. The computer-readable memory of claim 10, wherein said at least one cross-correlation coefficient comprises a first cross-correlation coefficient and a second cross-correlation coefficient.

12. The computer-readable memory of claim 11, further comprising:
    interpolating between said first cross-correlation coefficient and said second cross-correlation coefficient using said timing offset and said integer timing offset value to obtain an interpolated cross-correlation value.

13. The computer-readable memory of claim 12, wherein said interpolating comprises applying at least one of a linear function, a cubic spline, and a raised cosine function.

14. The computer-readable memory of claim 8, wherein the first identification comprises a first PN code identifier corresponding to the first received signal and the second identification comprises a second PN code identifier corresponding to the second received signal.

15. An apparatus comprising:
    means for receiving an input signal comprising a plurality of received signals;
    means for selecting a first received signal and a second received signal from said plurality of received signals;
    means for computing a timing offset between said first signal and said second signal; and
    means for using said timing offset, a first identification of said first signal, and a second identification of said second signal as indices to retrieve at least one cross-correlation coefficient.

16. The apparatus of claim 15, wherein the at least one cross-correlation coefficient is retrieved from a look-up table.

17. The apparatus of claim 15, wherein said timing offset is rounded to an integer timing offset value, wherein said at least one cross-correlation coefficient comprises a first cross-correlation coefficient and a second cross-correlation coefficient, wherein the apparatus further comprises:
 means for interpolating between said first cross-correlation coefficient and said second cross-correlation coefficient using said timing offset and said integer timing offset value to obtain an interpolated cross-correlation value.

18. An apparatus comprising:
 a multiplexer configured to select a first received signal and a second received signal from a plurality of received signals;
 a timing circuit configured to compute a timing offset between said first signal and said second signal; and
 a processor configured to retrieve at least one cross-correlation coefficient by using as indices said timing offset, a first identification identifying said first signal, and a second identification identifying said second signal.

19. The apparatus of claim 18, wherein said timing offset is rounded to an integer timing offset value.

20. The apparatus of claim 19, wherein said at least one cross-correlation coefficient comprises a first cross-correlation coefficient and a second cross-correlation coefficient.

21. The apparatus of claim 20, further comprising:
 an interpolator configured to interpolate between said first cross-correlation coefficient and said second cross-correlation coefficient using said timing offset and said integer timing offset value to obtain an interpolated cross-correlation value.

22. The apparatus of claim 21, wherein said interpolating further comprises applying at least one of a linear function, a cubic spline, and a raised cosine function.

23. The apparatus of claim 18, wherein the first identification comprises a first PN code identifier corresponding to the first received signal and the second identification comprises a second PN code identifier corresponding to the second received signal.

24. The apparatus of claim 18, further comprising a memory, wherein the at least one cross-correlation coefficient is stored in said memory as part of a look-up table.

* * * * *